United States Patent
Braathen

(10) Patent No.: US 11,802,394 B2
(45) Date of Patent: Oct. 31, 2023

(54) DISTRIBUTOR PIPE FOR A DISTRIBUTOR PIPELINE

(71) Applicant: Thor Frölich Braathen, Eggedal (NO)

(72) Inventor: Thor Frölich Braathen, Eggedal (NO)

( * ) Notice: Subject to any disclaimer, the term of this patent is extended or adjusted under 35 U.S.C. 154(b) by 183 days.

(21) Appl. No.: 17/599,394

(22) PCT Filed: May 28, 2020

(86) PCT No.: PCT/NO2020/050140
§ 371 (c)(1),
(2) Date: Sep. 28, 2021

(87) PCT Pub. No.: WO2020/242321
PCT Pub. Date: Dec. 3, 2020

(65) Prior Publication Data
US 2022/0042288 A1 Feb. 10, 2022

(30) Foreign Application Priority Data
May 28, 2019 (NO) .................................. 20190680

(51) Int. Cl.
*E03C 1/02* (2006.01)
*F16L 41/03* (2006.01)
*F24D 3/10* (2006.01)

(52) U.S. Cl.
CPC .............. *E03C 1/023* (2013.01); *F16L 41/03* (2013.01); *F24D 3/1066* (2013.01)

(58) Field of Classification Search
CPC ........ E03C 1/023; F16L 41/03; F24D 3/1066; E03B 7/071; E03B 7/078
See application file for complete search history.

(56) References Cited

U.S. PATENT DOCUMENTS

| 5,474,102 A | 12/1995 | Lopez |
| 10,273,665 B2 * | 4/2019 | Braathen ................ E03B 7/095 |

FOREIGN PATENT DOCUMENTS

| CN | 204647661 U | 9/2015 |
| CN | 205227471 U | 5/2016 |
| DE | 3110027 A1 | 12/1982 |
| DE | 3225516 C1 | 1/1984 |

(Continued)

OTHER PUBLICATIONS

Aasen, Olav Alfred; International Search Report; PCT/NO2020/050140; dated Jul. 6, 2020; 6 pages.

*Primary Examiner* — Michael R Reid
(74) *Attorney, Agent, or Firm* — Bradley Arant Boult Cummings

(57) ABSTRACT

A distributor pipe (1, 12, 12) for a distributor pipeline to distribute water to various places in a building structure. The distributor pipe has a through bore (15, 23) and two or more connections (3, 4, 24, 25) for connection of metal or plastic lubes or a valve (28), on the upper and/or the lower side of the 5 distributor pipe. The distributor pipe (1, 12, 22) connections (3, 4, 24, 25) are arranged in fluid communication with the through bore (15, 23) of the distributor pipe (1, 12, 22) on both sides of the distributor pipe through bore (15, 23) so that the centre axis of the bore of the connections (21) is situated outside of the through bore (15, 23). The connections (3, 4, 24, 25) on both sides of the 10 through bore are displaced in the longitudinal direction relative to each other.

6 Claims, 5 Drawing Sheets

(56) References Cited

FOREIGN PATENT DOCUMENTS

| DE | 3743771 | A1 | 7/1989 |
| DE | 202013101412 | U1 | 4/2013 |
| EP | 675312 | A1 | 10/1995 |
| NO | 341490 | B1 | 11/2017 |

* cited by examiner

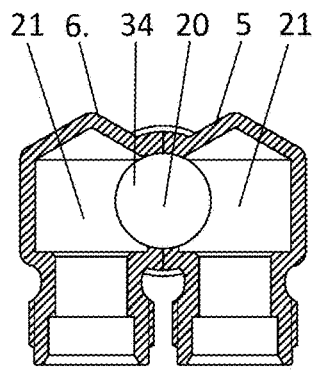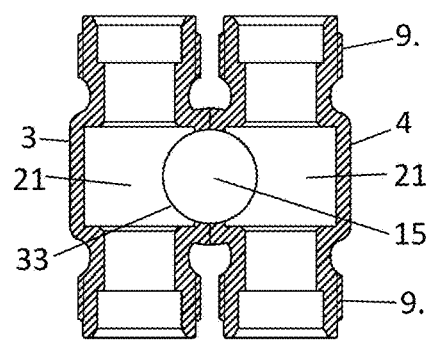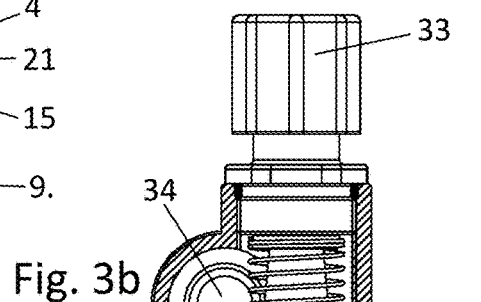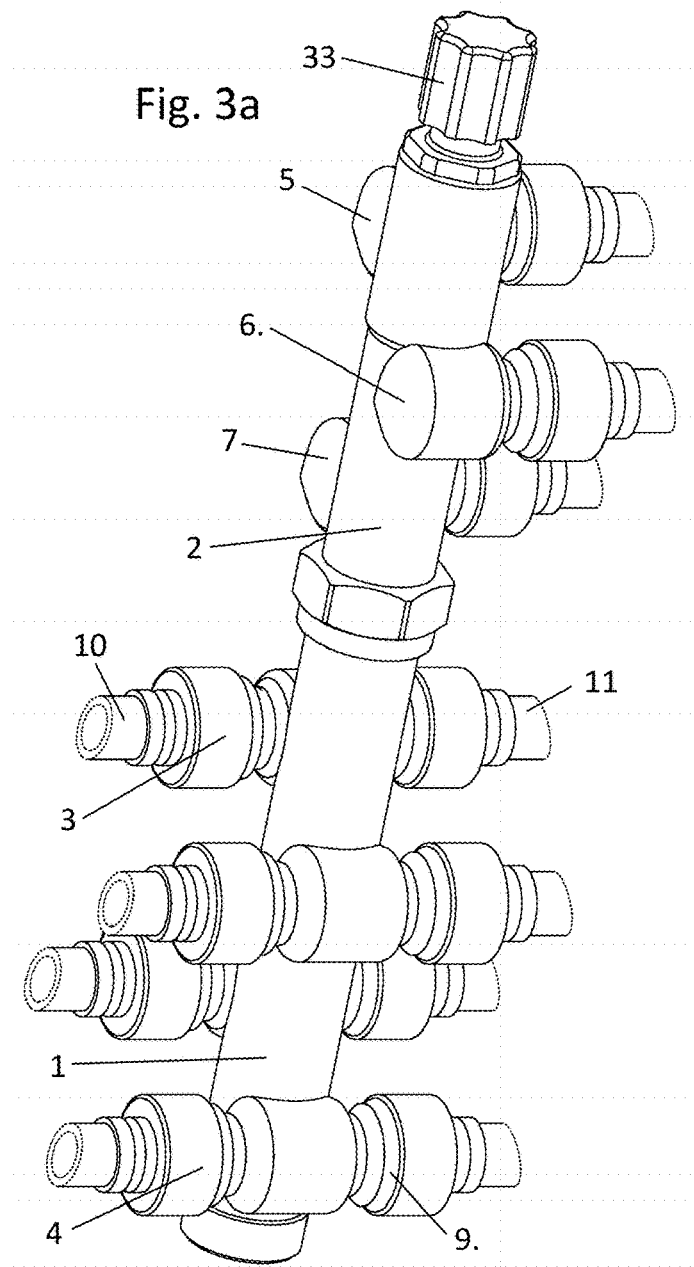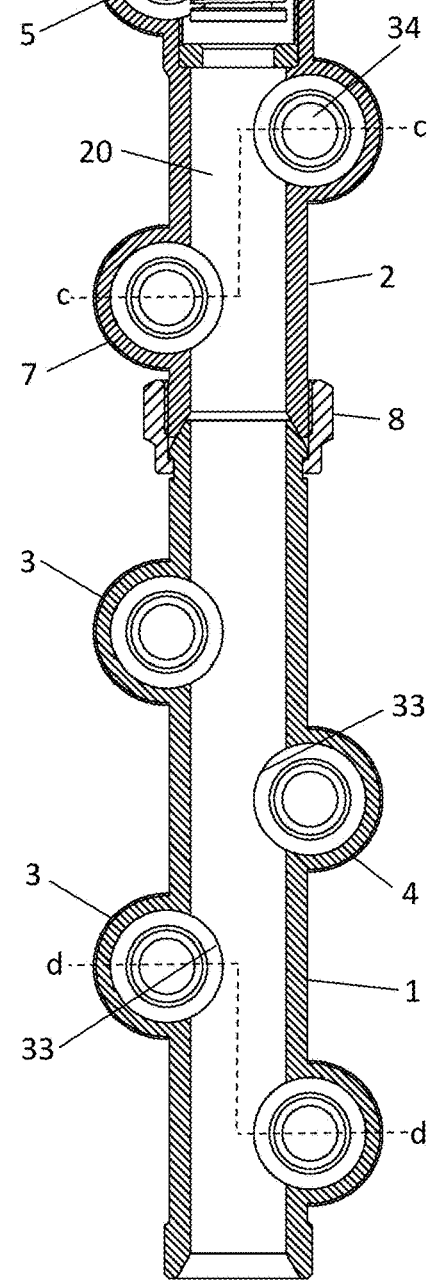

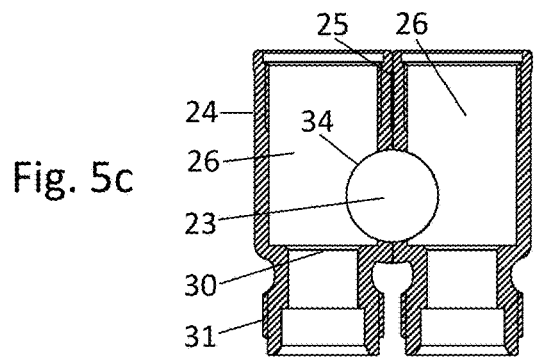
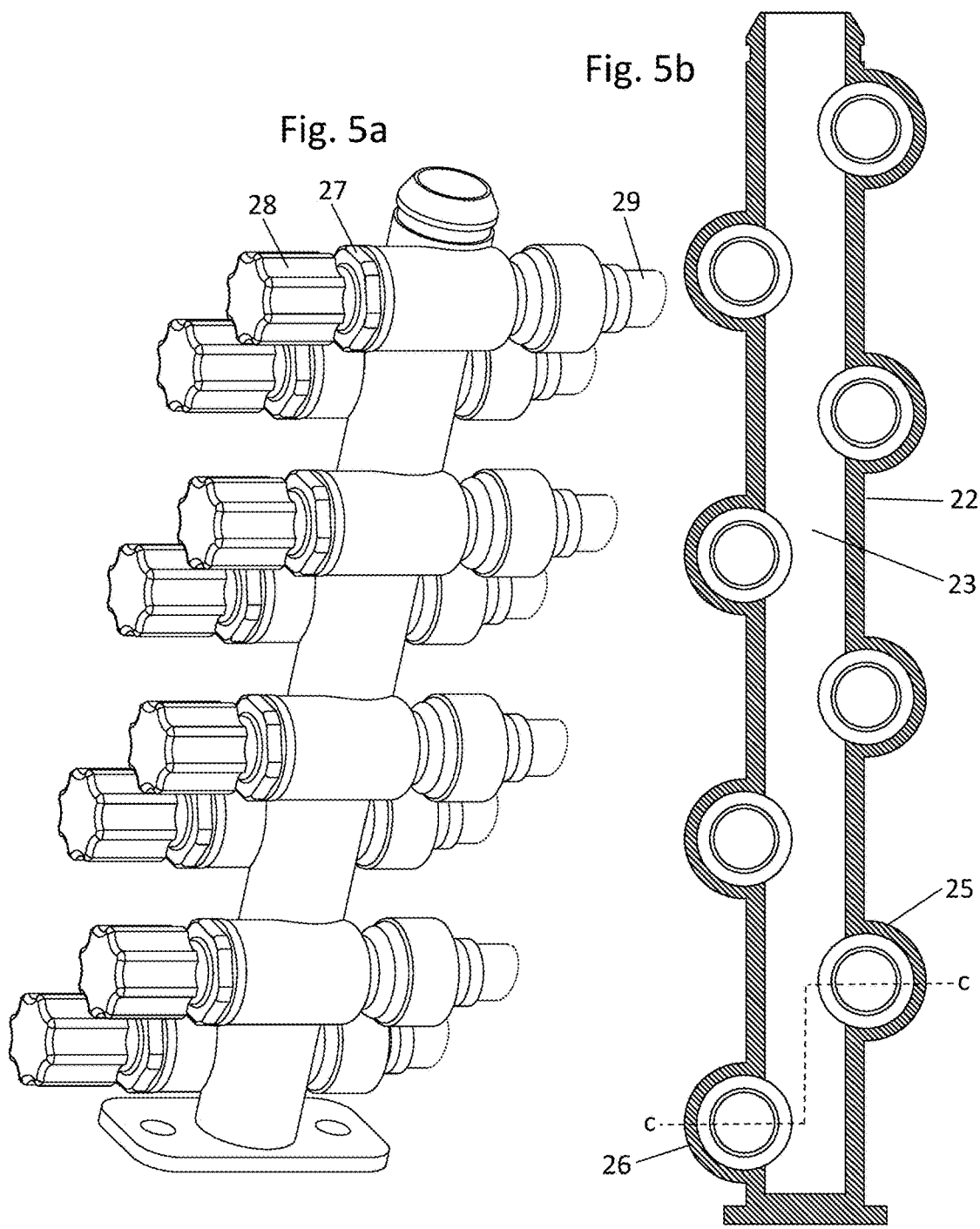

DISTRIBUTOR PIPE FOR A DISTRIBUTOR PIPELINE

TECHNICAL FIELD

The present invention relates to a manifold or distributor pipe for a distributor pipeline. Such a manifold constitutes the main component of a distributor pipeline in a distributor cabinet for distribution of water from a water intake to various tap points in a building. The distributor pipeline has thus one inlet and several outlets. Each outlet is coupled to at least one tap, such as a tap for a washbasin, a shower, a toilet, a washing machine or the like. The distribution cabinet is usually arranged on or partially within a wall, with a door giving access to the interior of the cabinet. Pipes to be coupled to the distributor pipe or manifold extend through the bottom or top of the cabinet.

TECHNICAL BACKGROUND

The most common solution of today, is that an upper distributor pipe in the distribution cabinet is for distribution of hot water and a lower distributor pipe is for cold water. The problem with this is however, especially in the summer, that the cold water pipe is heated by the hot water pipe. Often the temperature of the cold water pipe can exceed 20° C., which is the lower limit for the temperature area where the *legionella* bacterium has optimal conditions. Above this temperature limit, the *legionella* bacterium might increase to a level that is harmful for health.

With the solution of today, with an increasing number of taps in a building and where each outlet from the distributor pipe often is coupled to only one tap, there is a need for a large number of outlets. This means that there is less room for the pipelines that are extending to the tap points, for instance a bathroom. The obvious solution is to install further distribution pipes in a further cabinet. This results in a greater risk of damages caused by water.

New requirements to water installations is to have separate hot-water cabinets and cold-water cabinets, with separate pipelines to each tap point from the respective distribution pipe in the cabinet, and that the cabinet also has a separate outlet for drainage, to intercept potential leakage from the cabinet. For this is used a so-called pipe-in-pipe solution with external water pipeline to direct the leakage back to the cabinet and further to the drainage. Such solution is also described in the present applicant's own patent NO 341490.

Because of the requirement of separate cold water and hot water cabinet, where both must have a dimension of 540× 650 (width×height), these cabinets take up a lot of wall space. One of the objects of this invention is thus to provide a smaller height of the respective cabinets, and that are mounted flush with the inner wall of a building with a framework of c/c 600 mm. Despite a smaller height, the cabinet still has space for a pipeline outlet coupled to each tap point in the building.

FIGS. 1 and 2 show prior art solutions.

FIG. 1 shows a prior art cabinet with two distributor pipelines b and c to guide several water pipelines upwards and downwards from the cabinet.

FIG. 2 shows in isometric view, a prior art solution of a distribution pipe comprising a main pipe e, three upwardly oriented connections f and three downwardly oriented connections g for attachment of pipelines to guide the water to various taps. All these connections f, g are arranged in the same plane as the center axis of the main pipe e. The main pipe g may be coupled together with further distribution pipes to a longer distribution pipe or manifold. One end of the main pipe e may be defined as an inlet for supply of water. Many types of connectors may be used, such as screw or snap connections for the respective outlets that extends to each tap point.

There are known distributor pipes within other fields than water distribution. One example is shown in CN 204647661, which shows a high-pressure condenser tube with a plurality of pipe joints that are arranged in two staggered rows. It is not explained how the interior of the condenser is structured, however, if the main bore of the condenser is as wide as the opening at the end of the condenser, the pipe joints are arranged well within the main bore of the condenser. This results in a large diameter condenser that if adapted to act as a distributor pipe for water distribution, would not easily fit within a standard wall cabinet.

DE202013101412 shows a manifold for hydraulic lines. The manifold has a main bore and a plurality of connections are arranged displaced to one side of the main bore. The centre axis of the bores of the connections seem to fall within the main bore of the manifold.

DE 3110027 shows a distributor pipe for a water heated floor. Each distributor pipe comprises two connections to one side and two connections to the opposite side. The connections are staggered both with respect to the centre axis of the distributor pipe and lengthwise. The connections are placed completely within the main bore of the distributor pipe.

U.S. Pat. No. 5,474,102 shows a manifold for distributing air, such as to a water jet spa. In one embodiment the manifold has connections that are arranged in rows protruding in different directions. Two and two rows are parallel with the connections displaced somewhat away from the centre axis of the manifold. All connections are arranged well within the main bore of the manifold.

SUMMARY OF INVENTION

An object of the present invention is to provide room for a larger number of outlets than will be possible to accommodate in the same space with the above-mentioned solution. This is achieved by the features specified in the characterising clause of the subsequent claim 1. With the solution according to the invention it is possible to fit up to twice as many outlets to the same length of distribution pipe as the prior art solution.

The distributor pipe may comprise one continuous distributor pipe or several pipes that are connected into one single distributor pipe.

BRIEF DESCRIPTION OF DRAWINGS

FIGS. 3a, b, c and d show a distributor pipe according to the invention respectively in planar view, longitudinal section and two different cross sections, FIGS. 4a and b show a distributor pipe according to the invention mounted in a cabinet, in front elevation view and cross-sectional view, respectively, FIGS. 5a, b and c show a distributor pipe with a stopcock for each outlet from the pipe, in front elevation view, longitudinal section and cross section, respectively.

DETAILED DESCRIPTION OF THE INVENTION

Figure 1:
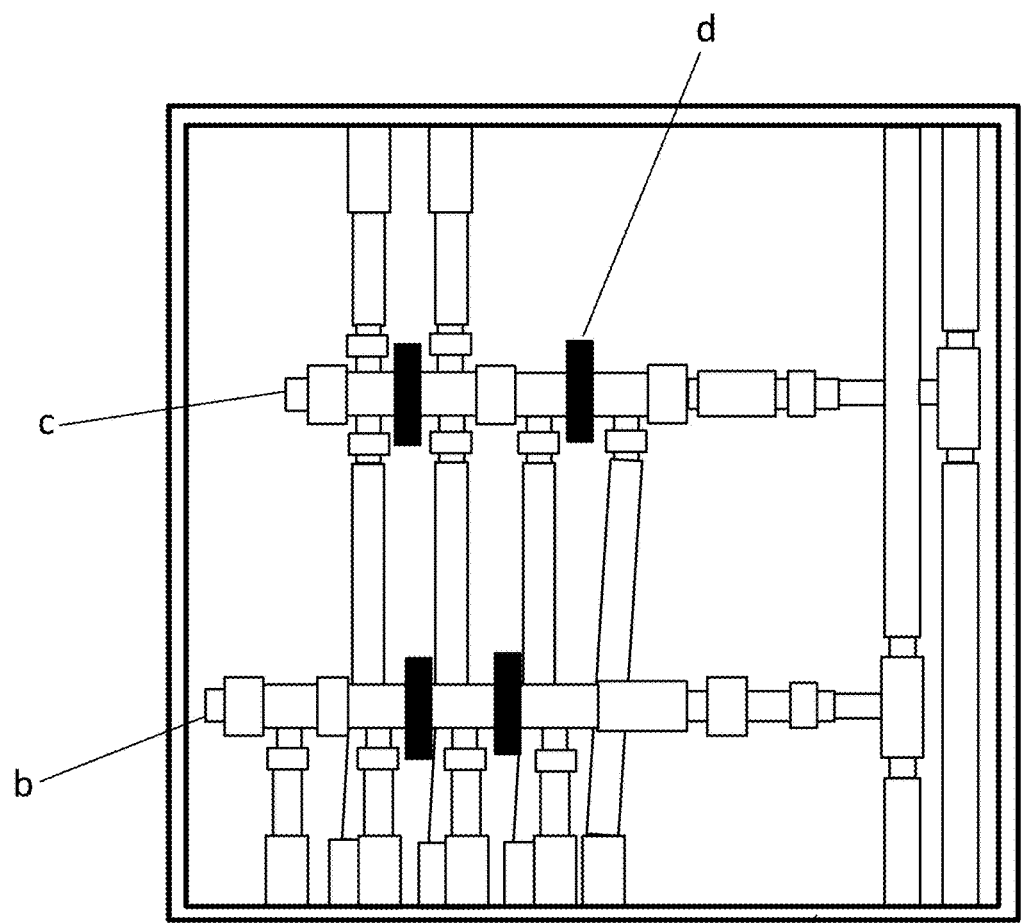
FIG. 1 shows a prior art distributor cabinet with distributor pipes.
Figure 2:
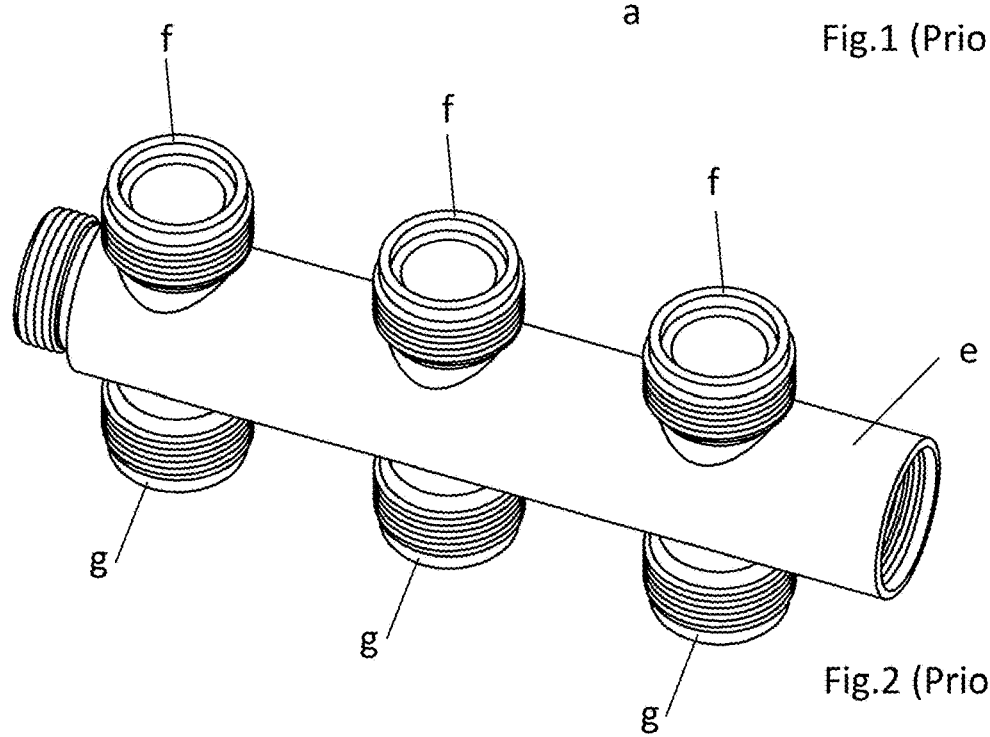
FIG. 2 shows a prior art distributor pipe.

FIGS. 3a, b, c and d show a distributor pipe 1 with a through bore 15 and two connections 3 protruding from the through bore 15 of the distributor pipe 1 on one side of the bore 15 and two connections 4 arranged protruding from the through bore in the distributor pipe 1 at the opposite side of the through bore 15. In other words, the bore of the connections 21 having a centre axis that is not in line with the centre axis of the through bore 15, but in fact the centre axis of the connections is arranged outside of the through bore 15. The bore 21 of the connections 3, 4 are, however, in fluid communication with the through bore 15 in an overlap region 34 between the through bore 15 and the connections 3, 4. The connections 3 and 4 are also displaced sideways so that the centre distance between each connection 3, 4 is preferably the same as between the connections in FIG. 2, e.g. 55 mm. This provides the same space for the tools necessary to make up or break the connection as for the prior art solution. Despite this, it is possible to fit up to twice as many connections within the same length of the distributor pipe 1.

The distributor pipe 1 is in one end connected to a thermostatic mixing valve 2 at a connection 8 between the distributor pipe 1 proper and a separate pipe 1b for inlet connections. The mixing valve 2 is coupled to a wheel 33 to adjust the mixing of hot and cold water. The inlet pipe 1b has connections 5, 6, 7 for attachment to cold water at connection 6, hot water at connection 5 and circulation lines at connection 7. The inlet pipe 1b with the mixing valve 2 has a through bore 20, which is arranged concentric with the through bore 15 in the distributor pipe 1. All the connections 5, 6, 7 are arranged protruding from the inlet pipe through bore 20, for maximum space utilization. However, the bores 21 of the connections 5, 6, 7 are in fluid communication with the through bore 20 in an overlap region 34 between these; in principle as for the distributor pipe 1 and the connections 3, 4. The connections 5, 6, 7 are in the shown embodiment facing downwardly when arranged in the cabinet. This will be the case in most installations, since the water supply and hot water tank are usually in the basement of a building.

The distributor pipe 1 is illustrated having both upwardly and downwardly facing connections, but it is also possible to arrange these, for example, only downwardly facing, for use, e.g., in the ground floor of a house where all pipes are arranged in the floor.

The connection 8 can be a conical connection or a screw connection. Pipelines 11 coupled to the connections 4 are guided downwards into the floor on the same floor as the distribution cabinet is mounted. Pipelines 10 coupled to the connections 3 are guided upwards from the floor where the distribution cabinet is mounted to respective tap point at the floors above.

The connections 3, 4, 5, 6 and 7 are equipped with appropriate fittings 9 for connection of the pipelines 10, 11.

FIG. 3c shows a cross section through the inlet pipe 1b with the mixing valve 2 at the line c-c in FIG. 3b. As is evident from this cross-section, there is a completely open communication for water flow between the bore 21 in the connections 5 and 6 and the through bore 20, as indicated by the overlap region 34.

FIG. 3d shows a cross section through the distributor pipe 1 at the line d-d in FIG. 3b. As is evident from this cross-section, there is a completely open communication for water flow between the bore 21 of the connections 3 and 4 and the through bore 15, as indicated by the overlap region 33.

Figure 4A:
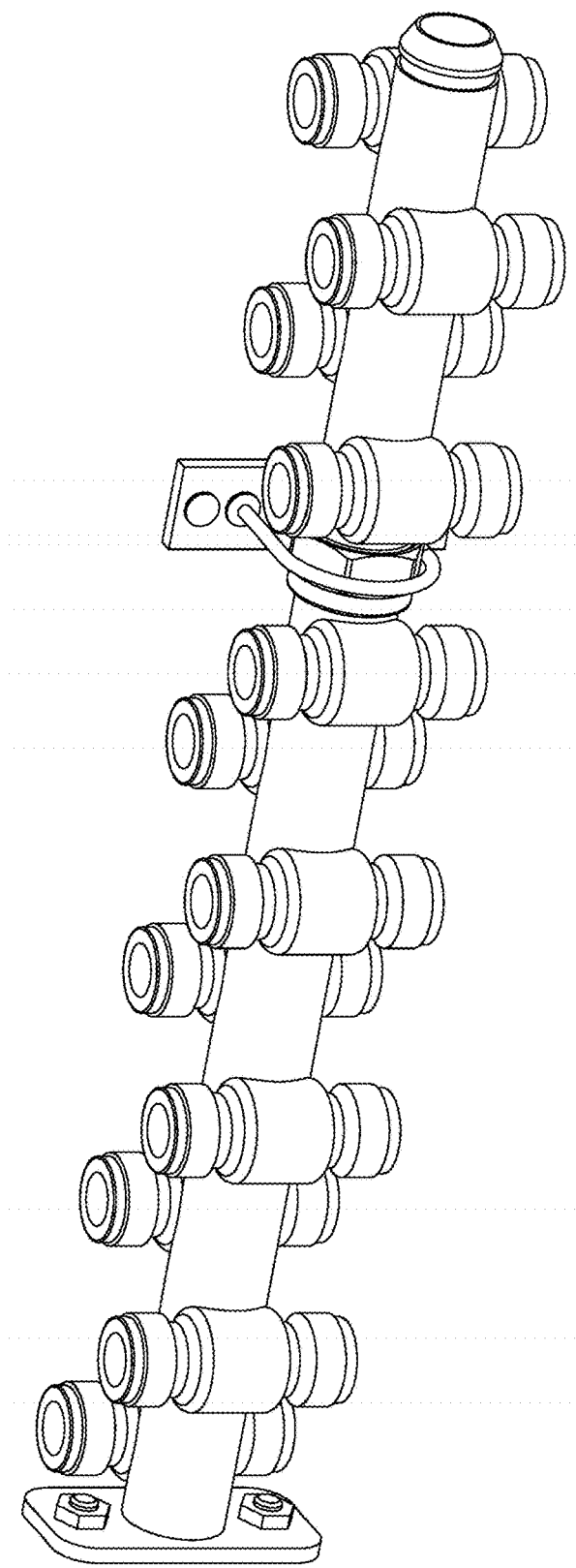
Figure 4B:
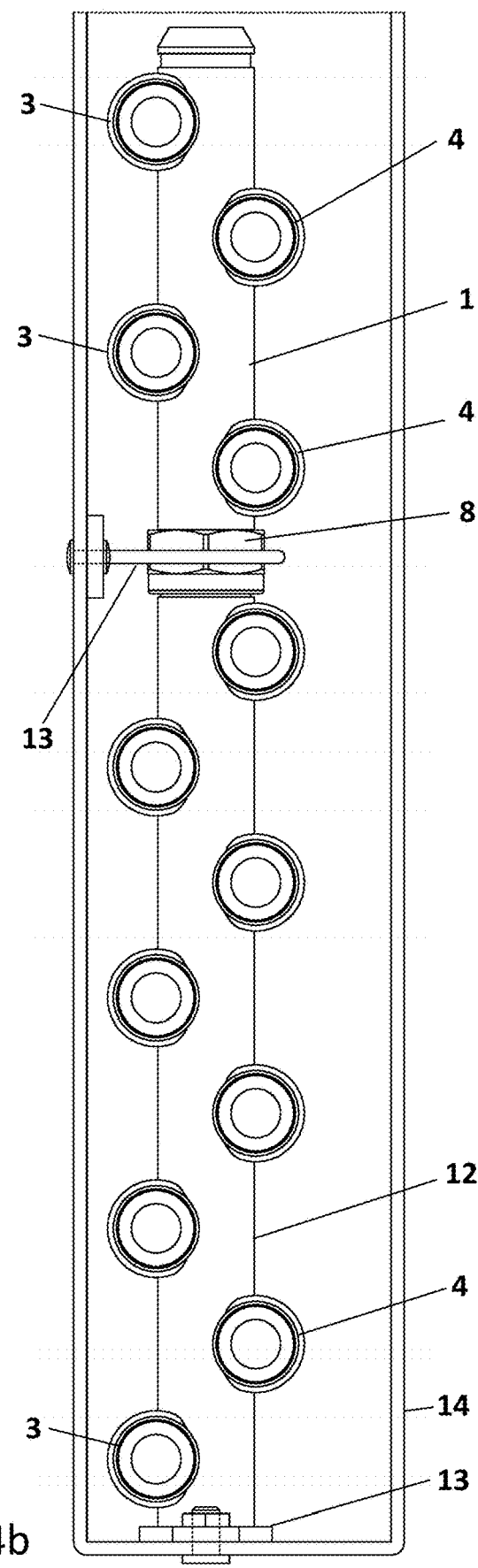

The FIGS. 4a and 4b show a distributor pipeline mounted firmly in a cabinet 14, respectively in the front elevation view and in a cross-sectional view through the cabinet. The distributor pipeline comprises a first distributor pipe 1 and a second distributor pipe 12, which are coupled to one another through a connection 8. The distributor pipeline is attached to the cabinet 14 by means of attachments 13 in an end wall of the cabinet 14. It is also coupled to a thermostatic mixing valve (not shown in FIGS. 4a and 4b, but as shown by reference number 2 in FIGS. 3a and 3b). Together, these components form a complete distributor pipeline, which, for example, can be of 500 mm length, for a hot water cabinet 14 with, e.g., fifteen pipe outlets 4 downwards to the floor and twelve outlets 3 upwards to the floor above. If fewer pipelines are required, the connections 9 may be are sealed with cap nuts.

The height of the cabinet can thus be reduced by approximately 30% compared with a distributor pipeline according to prior art, having the same number of pipes.

The distributor pipelines 1 and 12 can be used in both hot and cold water cabinets, cabinets for floor heating, or cabinets arranged outside.

FIGS. 5a, b, c show a distribution pipeline 22 in front elevation view, longitudinal section and cross section along the line c-c (see FIG. 5b), respectively. The distributor pipeline 22 has a through bore 23 and connections 24 and 25. The connections have an interface 31, such as a threaded stub. The connections have a cavity 26 that is arranged with its centre axis outside of the through bore 23 but is in communication with the through bore in an overlap region 34.

The cavities 26 have a respectively seat 30 which provides the possibility to mount a stopcock 28 for each pipe 29 via the interface 31.

The distributor pipe 22 can also be used in a cabinet for floor heating with several pipe loops that with variable lengths can be mounted in the floor, and where a balanced amount of water can be controlled with the stopcock 28.

Figure 6:
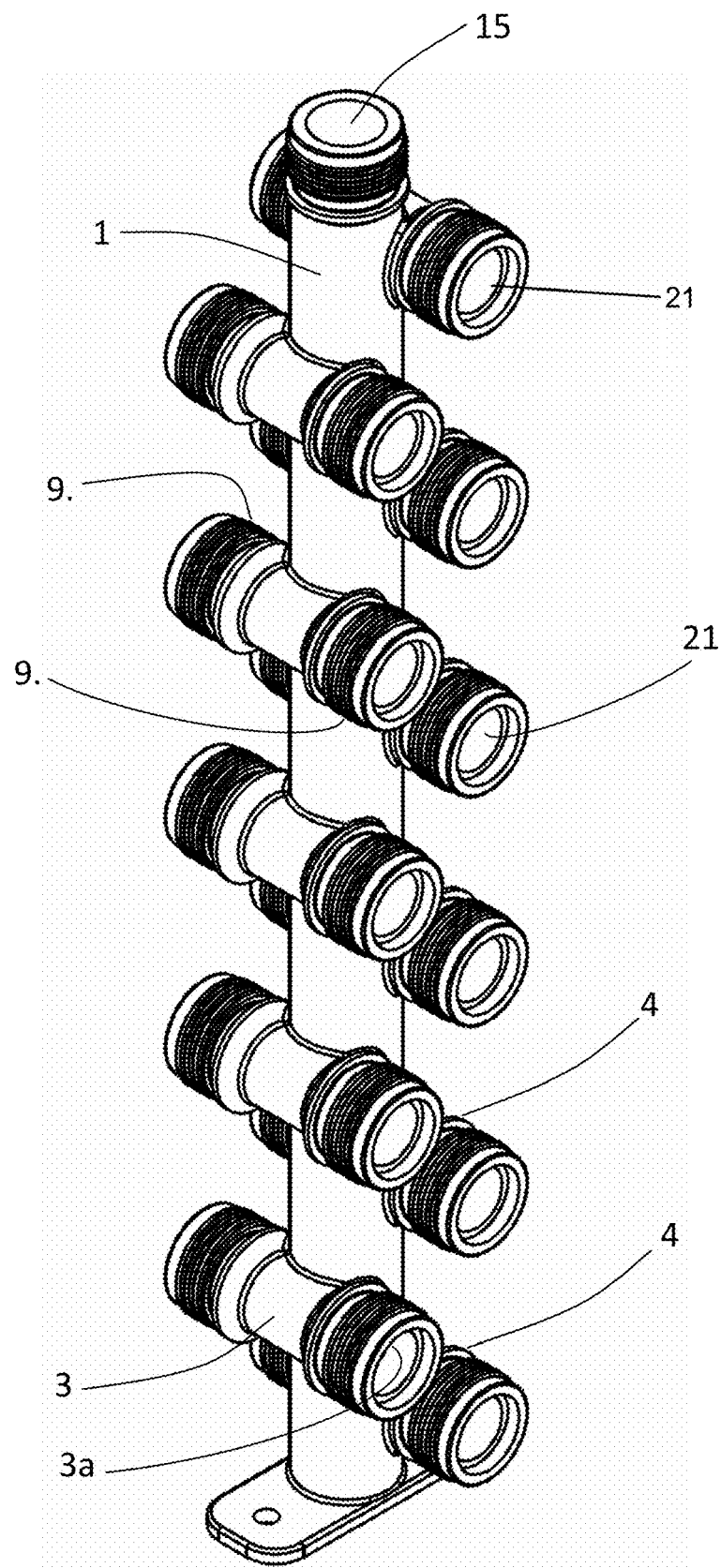
FIG. 6 shows an injection moulded or forged distribution pipe in isometric view.

FIG. 6 shows an injection moulded or forged distribution pipe 1 in perspective view and illustrates the connections 3, 4 having bores 21. The connections 3,4 are arranged with the centre line of their bores 21 placed outside of the main bore 15 of the distribution pipe 1. The distances between each connection 3, 4 are equal for the right and left side, and between each side. As for the distribution pipes above, the bore 21 of a connector 3a and the main bore 15 of the distribution pipe 1 are overlapping in an overlap region, which provides a complete flow between the bores 21 and the main bore 15.

The distribution pipe 1 and 12 with e.g. four or eight sockets for pipelines upwards and downwards have up to double capacity compared to the prior are distributor pipe of the same length. With only one distributor pipeline it will provide a 30% lower height cabinet and less space requirements inside a divisional wall in a house or an apartment.

The distribution pipe 22 have connections 31 that are only pointing downwards and a stopcock 28 for controlling the amount of water. The distribution pipe 22 has twice the number of connections downward for pipelines 29 compared to the embodiment of FIGS. 3a-d and can be used for both consumption water and for circulation of water for heated floors.

The invention claimed is:

1. A tap water distributor pipe for a distributor pipeline for the distribution of water to various places in a building structure, the tap water distributor pipe comprising:
   a through bore and two or more connections for connection of metal or plastic tubes or a valve, to at least one of the upper side and the underside of the distributor pipe, the connections protruding from, but being in fluid communication with, the through bore on respective sides of the through bore such that the center axis of the bores of the connections are not in line with the center axis of the through bore, and that the connections on either side of the through bore are displaced relative to each other in the longitudinal direction;
   wherein the connections are placed such that the center axis of the through bore of the connections are arranged outside of the through bore of the distributor pipe; and
   wherein the connections have connections facing both upwards and downwards when the distributor pipe is in an installed state.

2. The tap water distributor pipe according to claim 1, wherein at least two distributor pipes are configured to be coupled together to a continuous distributor pipeline.

3. The tap water distributor pipe according to claim 1, wherein the distributor pipe is configured to be coupled with a mixing valve having a valve body with a through bore and with connections protruding from the through bore of the valve body, and the connections having through bores with a center axis arranged outside of the through bore of the valve body.

4. The tap water distributor pipe according to claim 1, wherein the connections are arranged such that the distance from one connection to the adjacent connection arranged on the opposite side of the through bore is substantially the same as the distance to the closest connection on the same side of the through bore.

5. The tap water distributor pipe according to claim 1, wherein the distributor pipeline has one connection for each tap point in a water installation.

6. The tap water distributor pipe according to claim 1, wherein:
   the tap water distributor pipe is coupled to or forms part of the distributor pipeline; and
   the distributor pipeline is one continuous distributor pipeline arranged in one cabinet, thereby providing a correspondingly low building height of the cabinet.

* * * * *